Jan. 14, 1947.  C. G. HEBEL  2,414,302
LIQUID CONTROL GEAR
Filed Dec. 2, 1943  2 Sheets-Sheet 1
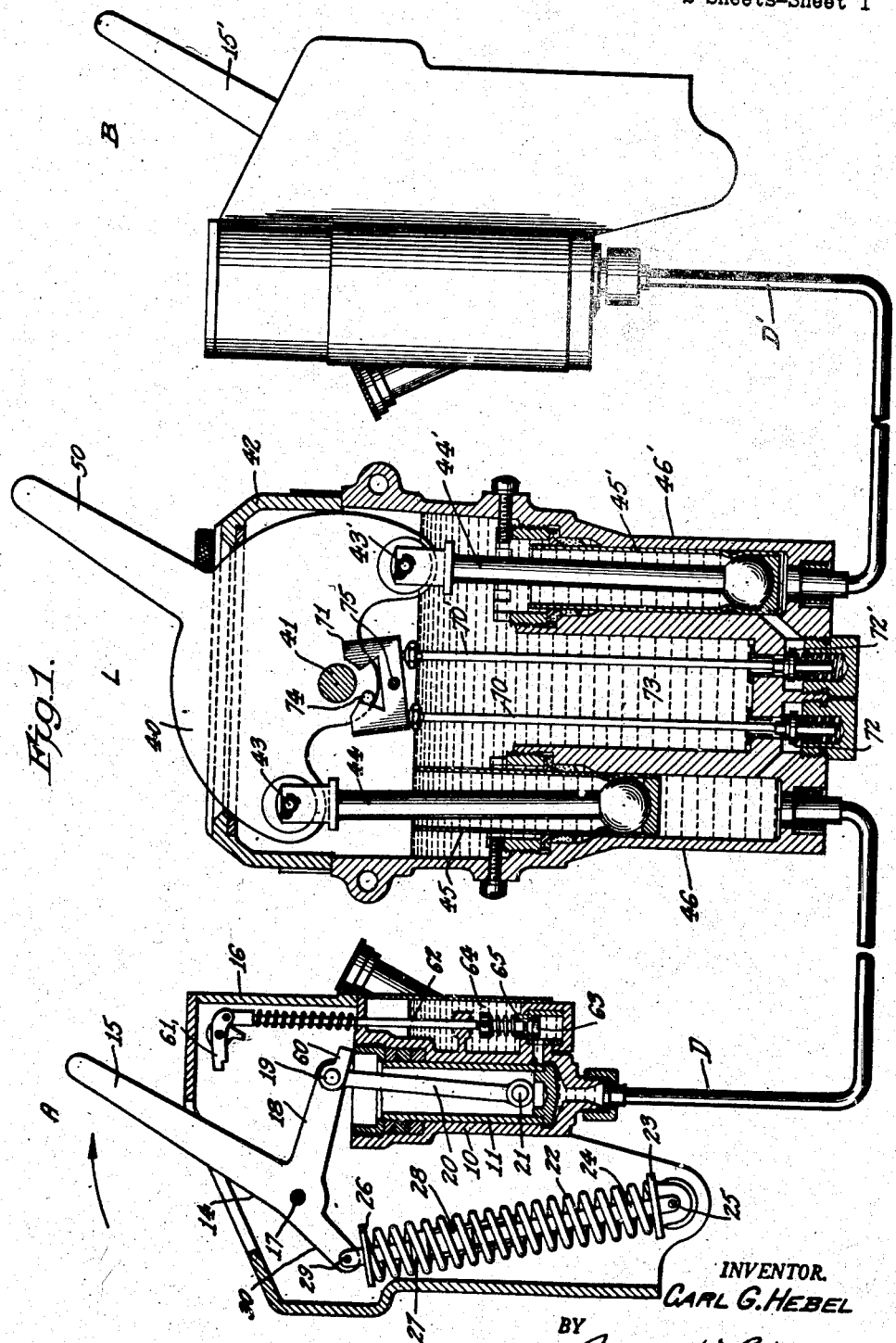
INVENTOR.
CARL G. HEBEL
BY
Joseph H. Lipschutz
ATTORNEY Jan. 14, 1947.                C. G. HEBEL                2,414,302
                          LIQUID CONTROL GEAR
                          Filed Dec. 2, 1943              2 Sheets-Sheet 2
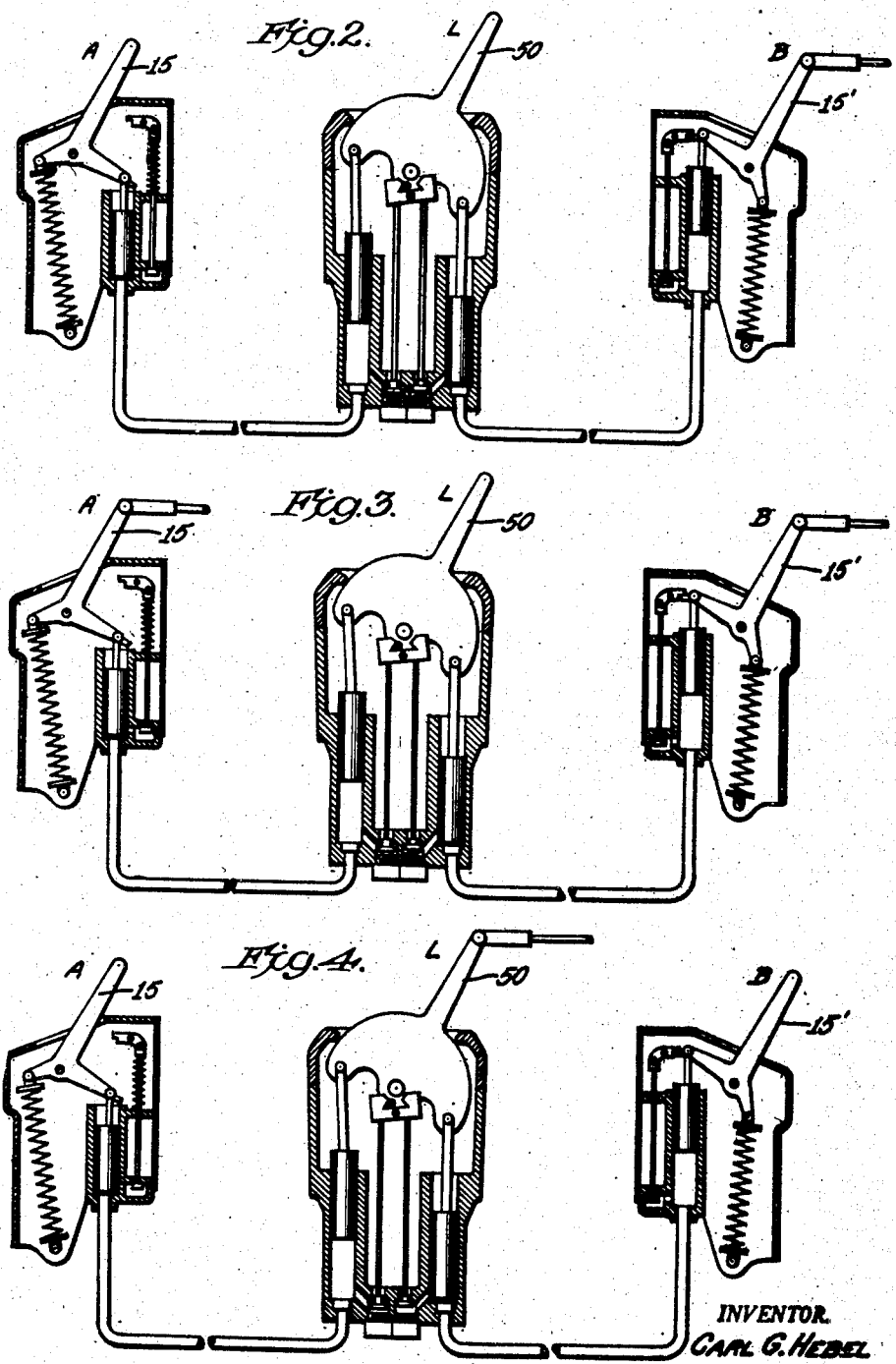
INVENTOR.
CARL G. HEBEL
BY
Joseph H. Lipschutz
ATTORNEY Patented Jan. 14, 1947

2,414,302

UNITED STATES PATENT OFFICE 2,414,302

LIQUID CONTROL GEAR

Carl G. Hebel, Weehawken, N. J., assignor to Sperry Products, Inc., Hoboken, N. J., a corporation of New York Application December 2, 1943, Serial No. 512,547

2 Claims. (Cl. 60—54.5)

This invention relates to liquid control gear of the type wherein movement of a member at a transmitting station is caused to control movement of a member at a receiving station. More particularly, this invention relates to control gear of this type wherein the transmitting and receiving stations are maintained under resilient pressure and are connected by a liquid transmission system. Control gears of this type are shown and described in the United States patent to H. S. Hele-Shaw and T. E. Beacham, No. 1,983,884, granted December 11, 1934, and the United States patent to A. N. Lawrence, No. 2,197,554, granted April 16, 1940. In the first of these patents a constant force is applied to the liquid transmission system in every position of the transmitter handle to overcome a constant force at the receiving end. In the Lawrence patent a constantly increasing force is transmitted as the transmitter handle is operated in the direction of the arrow, in order to overcome a constantly increasing force at the receiving end. The underlying principle in both of these types of liquid control gear is that the force applied at the transmission end is substantially equal to the force overcome at the receiving end, so that the system is in balance and the transmitter handle will remain in whatever position it is placed since there is no tendency on the part of the receiver end to return the transmitter handle to its initial position.

Thus, the systems described above, and to which the present invention relates, consist essentially of a transmitter station and a receiver station, said stations being under resilient pressure and connected by a column of liquid through which the forces are transmitted. The present invention relates to a similar system except that the force transferring connection between the transmitter station and the receiver station, instead of consisting solely of a liquid column, consists in a liquid connection which has interposed between its ends a force transmitting linkage. Thus, the force transferring connection consists of two liquid columns, one on either side of a force transmitting linkage. This linkage is therefore in cooperative relation to the fluid in the force transferring connection whereby the fluid can actuate the linkage and the linkage can actuate the fluid, and hence, the force is transferred through a combination of liquid and mechanical linkage from one station to the other.

As a result of this interposition of a force transferring linkage in the force transferring system between the stations, a wide variety of operating arrangements can be obtained and many different types of operating problems solved. Thus, for example:

1. In said balanced system, one of the stations under resilient pressure may be the transmitting station and the other station under resilient pressure may be the receiving station. Since the linkage is part of the force transferring connection, it will be actuated in accordance with the pressure in the system. At the same time, operation of the linkage will serve to increase pressure on the liquid on one side thereof and decrease pressure on the liquid on the other side thereof, the same as in the case where one of said stations under resilient pressure is operated. Therefore the force transferring linkage may be utilized as an auxiliary transmitter. Thus, for example, in the case of a ship where a transmitting station is located on the bridge, and the receiving station is connected in the engine room so as to operate an engine control, the said stations ordinarily being connected by a liquid force transferring connection, the interposition in this connection of the force transferring linkage permits said linkage to be positioned at some point on the ship other than the bridge, such as in the engine room, so that the engine control may be operated from the linkage which thus acts as an auxiliary transmitter.

2. In the balanced system the stations under resilient pressure may be connected to members adapted to be actuated, each station actuating one of the members. Both stations, and therefore both actuatable members may be operated simultaneously by operation of the force transmitting linkage. Thus, each station may be connected to the throttle of an engine, and operation of the linkage will actuate both stations, and therefore actuate the plurality of engines simultaneously. In this case, the force transferring linkage acts as the sole transmitter, while the stations under resilient pressure act as receivers.

3. In the balanced system, each station under resilient pressure may be utilized as a transmitting station, the actuatable member being connected to the force transmitting linkage. Thus, a signal to the engine room of a ship may be operated from either the stern or the bridge of the ship. In this case, the force transmitting linkage serves as a sole receiver, while the stations under resilient pressure are both transmitters.

In all of the above arrangements the movable members of the two stations under pressure, as well as the force transmitting linkage, all move in synchronism so that whichever of these stations is operated, the other movable members will move in synchronism with the member which is operated.

Further objects and advantages of this invention will become apparent in the following detailed description thereof:

In the accompanying drawings,

Fig. 1 is an assembly view, with certain parts sectioned vertically, of a liquid control gear system embodying my invention.

Figs. 2, 3 and 4 are similar views, largely diagrammatic, illustrating three different species of this invention, all embodying the arrangement shown in Fig. 1.

I have shown this invention as applied to the form of liquid control gear in the said Lawrence Patent No. 2,197,554, but it will be understood that this is for purposes of illustration only, and that the invention is applicable to any other balanced liquid control gear system, such as the one shown by Hele-Shaw et al., No. 1,983,884.

Such systems comprise three main parts including parts A and B which are two similar stations under resilient pressure, and a force transferring means adapted to transfer excess pressure between stations A and B. Each of stations A and B may comprse a cylinder 10 within which operates a piston 11. Said cylinder is connected at one end to a duct D which is filled with liquid extending up to said piston. For operating said piston in a direction to transmit force to the liquid column, there may be provided an operating lever 14 in the form of a bell crank, said lever being pivoted in casing 16 at 17. Said lever comprises a handle 15 and a crank arm 18 pivotally connected at 19 to the upper end of a piston rod 20 pivotally connected to the piston at 21. As the handle is moved in the direction of the arrow, the piston is lowered to cause the column of liquid to move through the duct D. The force which is applied to the piston is determined by a loading spring 22 seated against a bracket 23 fixed upon a rod 24 pivoted at 25 within the casing 16. The other end of said loading spring bears against a bracket 26 fixed to a member 27 having a sleeve 28 within which rod 24 may slide so that the spring is extensible. The member 27 is pivoted at 29 to a crank arm 30 formed on the lever 14. The position of the spring and its connections is such that the spring acts through a small lever arm to apply a very slight loading force to crank arm 18 and the piston 11 when the piston is in its uppermost position, but as the handle 15 is actuated in the direction of the arrow, it will be seen that the spring acts through an increasing effective lever arm. At the same time, however, the spring is extended so that while it acts through a larger effective lever arm, it applies a decreasing force as said effective arm increases. The design of the various parts may be made such that the rate of decrease of the compressor force of the spring is equal, slower than, or greater than the rate of increase of the lever arm as handle 15 is actuated in the direction of the arrow whereby the force applied to the piston 11, which is the product of these two factors, will either be constant, increased continuously, or decreased continuously to apply a constant, continuously increasing or continuously decreasing loading force on the piston as it is moved into the cylinder 10. Element A described above is duplicated at station B where there is a similar piston under similar pressure. Therefore, the pressures on the pistons at the two stations are always equal, and the force which an operator applies to the handle 15 need only be sufficient to overcome friction in the system. A force applied to the operating handle 15 or to the operating handle 15' will cause the other handle to be moved in synchronism by reason of the fact that the force applied to the handle is transmitted to the force transmitting connection which transfers the excess force between stations A and B.

Heretofore, the force transferring connection C consisted of a single duct filled with fluid and extending from piston 11 in station A to the corresponding piston in station B. My invention consists in a new type of force transferring connection wherein the duct heretofore employed is interrupted by means of a force transmitting linkage interposed between the ends of the duct, so that in effect, there is obtained two ducts D and D', the duct D connecting pressure station A with the force transmitting linkage L, and the duct D' connecting said linkage L with the pressure station B. The force transmitting linkage, as shown in Fig. 1, may comprise a lever 40 pivoted at 41 in a casing 42 and connected at one end 43 to a piston rod 44 pivotally connected to a piston 45 operating in a cylinder 46, which, at its lower end, is connected to the duct D. The other arm of lever 40 may be connected at 43' to a link or piston rod 44' pivotally connected to a piston 45', which, at its lower end, is connected to the duct D'. The lever 40 may be provided with an operating arm 50.

The parts are originally set so that when piston 11 is in its uppermost position, piston 45 is in its lowermost position. At this point piston 45' will necessarily be in its uppermost position, and the corresponding piston in station B will be in its lowermost position. Means are provided for maintaining the liquid column between piston 11 and piston 45, and between piston 46' and the corresponding piston 11 in station B filled with liquid by synchronizing means which becomes effective each time any one of these pistons reaches its uppermost position. Thus, when piston 11 reaches its uppermost position, connection is made between the fluid in cylinder 10 and the fluid in reservoir 64 by means of a valve 63 which is opened when the piston 11 reaches its uppermost position. In said uppermost position an arm 60 carried by the piston rod 20 actuates trip mechanism 61 to depress the valve stem 62 to open valve 63 and permit fluid from reservoir 64 to communicate with the fluid in the transmission system through a passage 65. Similarly each time piston 45 or piston 45' reaches its uppermost position, a link 70 or 70' is engaged by a double-acting bell crank 71 pivoted at 75 and actuated by a pin 74 on lever 40 each time it moves to its extreme position in order to open the respective valve 72 or 72' to permit communication between a reservoir 73 and the respective cylinder 46 or 46' to replenish the fluid in the transmission system. The provision of fluid-replenishing means at each end of each duct D, D' will insure synchronization which might otherwise be prevented by the formation of vacuum pockets. Thus, should there be leakage of fluid either in the part D or D' which would tend to cause loss of synchronism between the operating members 15, 15' and 50, such synchronism will be reestablished each time any one of the pistons reaches its uppermost position. The drawings show the extreme position of each device, and it will be understood that during the operative portion of each piston stroke, valves 63, 72 and 72' are closed.

From the above description it will be apparent that the two pistons 45 and 45' operate oppositely in their cylinders, and that when force is applied to the fluid in duct D by applying a force to handle 15, the piston 45 will be raised, and piston 45' will be lowered to transmit this force to the fluid in duct D', and thence to pressure station B. Thus, the force transmitting linkage L which is a mechanical link between the two liquid columns D and D', nevertheless acts like a liquid column, and the sum total of the liquid column D, force transmitting linkage L, and liquid column D', is in its action essentially the same as that of the single duct in the patents to Lawrence and Hele-Shaw et al. Therefore, the stations A and B may be operated in the same manner as these stations have been operated heretofore, but in addition, by the interposition of the force transmitting linkage L, I obtain an arrangement which makes possible a far wider variation of uses for solving many more and different problems than was heretofore possible by the Lawrence and Hele-Shaw et al. structures. Some idea of these new arrangements and uses for solving a multiplicity of problems has been set forth in the introduction hereto, but will now be more specifically described in connection with the diagrammatic showing in Figs. 2, 3 and 4.

Referring to the diagrammatic showing in Fig. 2, it will be apparent that if pressure is applied to the handle 50 the same force will be applied to the fluid in duct D or D' as when handle 15 or 15' is operated. Therefore, force transmitting linkage L may be utilized as an auxiliary transmitter if desired. Thus, if station A is on the bridge of a ship, and station B is adjacent an engine with element 15' connected to the throttle of an engine, linkage L may be positioned in the engine room close to the engine so that if desired, or if the occasion demands it, the engineer can operate the throttle by operating handle 50. This will cause member 15' to be actuated in the same manner as when handle 15 is operated. Operation of handle 50 will therefore actuate members 15' and 15 so that such actuation by the auxiliary transmitter L will not only actuate the engine throttle but such actuation will become evident on the bridge by reason of the repositioning of the element 15.

Referring now to Fig. 3, it is apparent from the description in the preceding paragraph that operation of handle 50 actuates elements 15 and 15'. Therefore, if elements 15 and 15' are both connected to members adapted to be actuated, as for instance, if each of these elements is connected to the throttle of an engine, it will be apparent that operation of handle 50 will serve to actuate both elements 15 and 15' simultaneously, and therefore both engines can be operated simultaneously. Thus, the force transmitting linkage L may act as the sole transmitter, with the pressure elements A and B both being receiver elements.

Referring to Fig. 4, it will be seen that since element 50 is actuated in synchronism with elements 15 and 15', operation of either element 15 or 15' will result in actuation of handle 50. Therefore, if handle 50 is connected to an element to be operated, as for instance, if handle 50 is connected to the throttle of an engine, such engine may be controlled from either station A or station B, which may be located at widely spaced points. In this arrangement therefore, stations A and B both act as transmitters while the force transmitting linkage L acts as the actuated member capable of being operated from either of two stations. From whichever station, A or B, the member 50 is actuated, such actuation will become apparent at the other station by reason of the fact that all three elements, 15, 15' and 50, operate in synchronism.

While in the foregoing description the force transferring connection has been described as including a single force transferring linkage L with connecting ducts D and D', it will be understood that any number of such linkages L may be inserted in series in the connection between stations A and B. In such case, each succeeding linkage L would have its cylinder 46 connected to the cylinder 46' of the preceding linkage by a duct similar to duct D or D'.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a hydraulic transmission system, a transmitter, a receiver, said transmitter and said receiver each comprising a cylinder, a piston operating in the cylinder and means for placing the piston under predetermined pressure, an intermediate transmission device including a pair of cylinders, a piston in each of said intermediate cylinders, a pivoted rocker having arms connected to the respective intermediate pistons, a fluid connection between one intermediate cylinder and the transmitter cylinder and a second fluid connection between the other intermediate cylinder and the receiver cylinder, and means connected to the rocker whereby the rocker may be actuated or actuation of the rocker will actuate said connected means.

2. In a hydraulic transmission system, a transmitter, a receiver, said transmitter and said receiver each comprising a cylinder, a piston operating in the cylinder and means for placing the piston under predetermined pressure, an intermediate transmission device including a pair of cylinders, a piston in each of said intermediate cylinders, a pivoted rocker having arms connected to the respective intermediate pistons, a fluid connection between one intermediate cylinder and the transmitter cylinder and a second fluid connection between the other intermediate cylinder and the receiver cylinder, fluid replenishing means cooperating with each end of each of said fluid connections, and means connected to the rocker whereby the rocker may be actuated or actuation of the rocker will actuate said connected means.

CARL G. HEBEL.